US012666257B2

(12) United States Patent
Lee et al.

(10) Patent No.: US 12,666,257 B2
(45) Date of Patent: Jun. 23, 2026

(54) SYSTEM AND METHOD OF DEVICE DEPLOYMENT

(71) Applicant: Getac Technology Corporation, New Taipei City (TW)

(72) Inventors: Jiunn-Jye Lee, Taipei City (TW); Hsuan-Wei Tsao, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 31 days.

(21) Appl. No.: 18/906,400

(22) Filed: Oct. 4, 2024

(65) Prior Publication Data

US 2025/0301312 A1     Sep. 25, 2025

(30) Foreign Application Priority Data

Mar. 22, 2024   (CN) .......................... 202410333966.0

(51) Int. Cl.
H04L 29/06        (2006.01)
H04W 12/037       (2021.01)

(52) U.S. Cl.
CPC ................................. H04W 12/037 (2021.01)

(58) Field of Classification Search
CPC . H04L 63/0428; H04L 63/20; H04L 63/0435; H04W 12/033; H04W 12/037; H04W 12/03
See application file for complete search history.

(56) References Cited

U.S. PATENT DOCUMENTS

| | | | |
|---|---|---|---|
| 9,425,962 B2 * | 8/2016 | Ramon | ................. H04W 12/06 |
| 10,555,250 B2 | 2/2020 | Wang et al. | |
| 11,450,196 B2 * | 9/2022 | Daoura | ............... H04W 52/028 |
| 2001/0044905 A1 | 11/2001 | Novak et al. | |
| 2006/0010176 A1 | 1/2006 | Armington | |
| 2009/0240790 A1 | 9/2009 | Utsunomiya et al. | |
| 2014/0052875 A1 | 2/2014 | Carter et al. | |
| 2015/0372717 A1 | 12/2015 | Schrum, Jr. et al. | |

(Continued)

FOREIGN PATENT DOCUMENTS

| | | |
|---|---|---|
| CN | 103793833 B | 6/2017 |
| CN | 106664226 B | 5/2020 |

(Continued)

OTHER PUBLICATIONS

Kumar Vinay et al., "A Voice Based One Step Solution for Bulk IoT Device Onboarding," 2019 16th IEEE Annual Consumer Communications & Networking Conference (CCNC), IEEE, Jan. 11, 2019 (Nov. 1, 2019), pp. 1-6.

*Primary Examiner* — Longbit Chai
(74) *Attorney, Agent, or Firm* — COOPER LEGAL GROUP LLC

(57)                ABSTRACT

A method of device deployment includes steps as follows. Each of a plurality of receiving devices executes a Bluetooth low energy mode when being booted initially. Any one individual receiving device in the plurality of receiving devices decrypts a plurality of sub-encrypted messages repeatedly sent by a sending device executing the Bluetooth low energy mode, so as to generate a message of mass deployment setting corresponding to the plurality of sub-encrypted messages. The individual receiving device executes a subsequent deployment according to the message of mass deployment setting after the individual receiving device is booted initially.

16 Claims, 4 Drawing Sheets

300

The sending device generates a message of mass deployment setting, and executes an encryption and segmentation process on the message to obtain the plurality of sub-encrypted messages — S301

The sending device executes a BLE mode to repeatedly send the plurality of sub-encrypted messages in sequence at fixed time intervals — S302

Within a communication range of the BLE mode of the sending device, each of the receiving devices activates a built-in initial boot service when being initially booted, so that each of the plurality of receiving devices executes the BLE mode to continuously receive the plurality of sub-encrypted messages — S303

After any one individual receiving device in the plurality of receiving devices receives the plurality of sub-encrypted messages and decrypts them to restore into the message of mass deployment setting, the individual receiving device executes a subsequent deployment according to the message of mass deployment setting after the individual receiving device is booted initially — S304

(56)                    References Cited

U.S. PATENT DOCUMENTS

| | | |
|---|---|---|
| 2016/0054396 A1 | 2/2016 | Bell et al. |
| 2016/0085538 A1 | 3/2016 | Finch |
| 2019/0012705 A1 | 1/2019 | Todeschini et al. |
| 2019/0303130 A1 | 10/2019 | Saeed et al. |
| 2020/0036785 A1 | 1/2020 | Kandula et al. |
| 2020/0036792 A1* | 1/2020 | Palin ...................... H04W 4/80 |
| 2022/0276329 A1 | 9/2022 | Sun et al. |
| 2023/0179668 A1 | 6/2023 | Lin et al. |
| 2023/0379683 A1 | 11/2023 | Roberts et al. |
| 2024/0089234 A1 | 3/2024 | Kumar et al. |
| 2025/0301312 A1* | 9/2025 | Lee .................... H04L 63/0428 |

FOREIGN PATENT DOCUMENTS

| | | |
|---|---|---|
| CN | 107925654 B | 3/2021 |
| CN | 110493758 B | 1/2023 |
| CN | 117675633 A | 3/2024 |
| EP | 3352525 B1 | 3/2021 |
| TW | 200912239 A | 3/2009 |
| TW | I542164 B | 7/2016 |
| TW | I620455 B | 4/2018 |
| TW | I710778 B | 11/2020 |
| WO | 2013066938 A1 | 5/2013 |
| WO | 2017181560 A1 | 10/2017 |

* cited by examiner

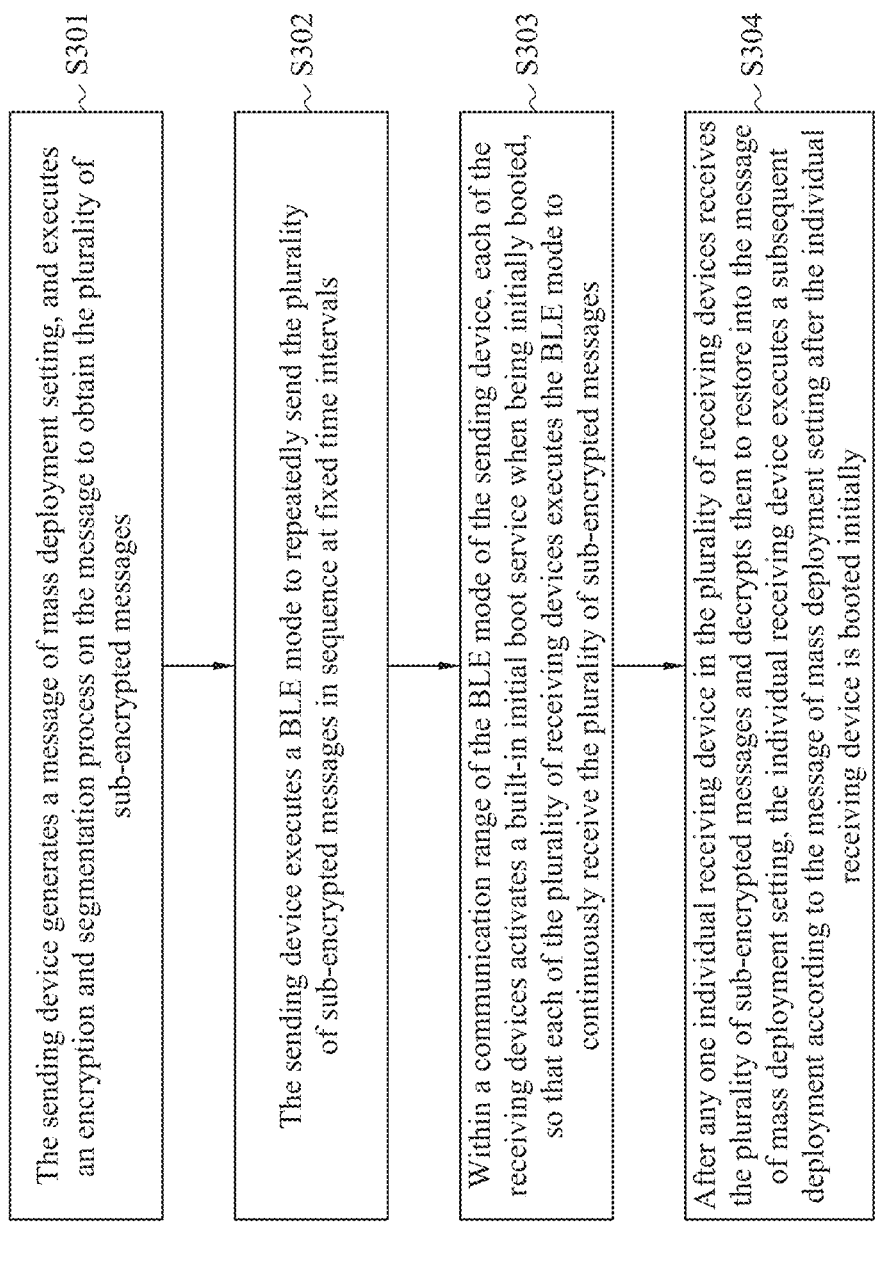

300

The sending device generates a message of mass deployment setting, and executes an encryption and segmentation process on the message to obtain the plurality of sub-encrypted messages ~ S301

The sending device executes a BLE mode to repeatedly send the plurality of sub-encrypted messages in sequence at fixed time intervals ~ S302

Within a communication range of the BLE mode of the sending device, each of the receiving devices activates a built-in initial boot service when being initially booted, so that each of the plurality of receiving devices executes the BLE mode to continuously receive the plurality of sub-encrypted messages ~ S303

After any one individual receiving device in the plurality of receiving devices receives the plurality of sub-encrypted messages and decrypts them to restore into the message of mass deployment setting, the individual receiving device executes a subsequent deployment according to the message of mass deployment setting after the individual receiving device is booted initially ~ S304

Fig. 3

SYSTEM AND METHOD OF DEVICE DEPLOYMENT

RELATED APPLICATIONS

This application claims priority to China Application Serial Number 202410333966.0, filed Mar. 22, 2024, which is herein incorporated by reference.

BACKGROUND

Field of Invention

The present disclosure relates to a system and a method. More particularly, the present disclosure relates to a system and a method of device deployment.

Description of Related Art

In a wireless environment, if a large number of devices need to be unboxed, or many different settings of the devices need to be deployed, how to execute the first deployment step will typically become the key to whether the entire mechanism has practicality or not. Common methods include the following.

The first method is to manually set a Wi-Fi connection to a remote server. Although access points (APs) without authentication can simplify the connection process, there are security concerns. Setting up authenticated APs will increase the complexity of the connection setup steps.

The second method is to set up through an offline method, such as QR code or file transmission, etc., but manual operation one device at a time is inevitable in this method.

SUMMARY

The present disclosure provides a system and a method of device deployment to improve the problems in the related art.

A method of device deployment is provided. The method of device deployment includes: generating a message of mass deployment setting and executing an encryption and segmentation process on the message to obtain a plurality of sub-encrypted messages through a sending device; executing a BLE mode to repeatedly send the plurality of sub-encrypted messages in sequence at fixed time intervals through the sending device; activating a built-in initial boot service through each of a plurality of receiving devices when being booted initially so that the each of the plurality of receiving devices executes the BLE mode to continuously receive the plurality of sub-encrypted messages within a communication range of the BLE mode of the sending device; and after any one individual receiving device in the plurality of receiving devices receives the plurality of sub-encrypted messages and decrypts them to restore into the message of mass deployment setting, executing a subsequent deployment according to the message of mass deployment setting after the individual receiving device is booted initially through the individual receiving device.

In the foregoing, each of the plurality of sub-encrypted messages includes a protocol identifier, a sender identifier of the sending device, a message identifier of the message of mass deployment setting, a total number of messages of the plurality of sub-encrypted messages, a sub-encrypted message number, and an encrypted message body.

In the foregoing, the step of executing the subsequent deployment according to the message of mass deployment setting after the individual receiving device is booted initially through the individual receiving device after the any one individual receiving device in the plurality of receiving devices receives the plurality of sub-encrypted messages and decrypts them to restore into the message of mass deployment setting includes: each time when the individual receiving device receives a sub-encrypted message in the plurality of sub-encrypted messages, determining whether a format of the sub-encrypted message conforms to a preset legal format or not; determining whether the protocol identifier matches a preset protocol identifier or not when the format of the sub-encrypted message conforms to the preset legal format; recording the sender identifier, the message identifier, and the total number of messages when the protocol identifier matches the preset protocol identifier; establishing a message list, and adding the sub-encrypted message number and the encrypted message body of the sub-encrypted message into the message list; continuing to receive other sub-encrypted messages with other sub-encrypted message numbers that match the message identifier in the BLE mode until a number of the received plurality of sub-encrypted messages reaches the total number of messages; combining the plurality of encrypted message bodies correspondingly in the plurality of sub-encrypted messages in sequence according to the sub-encrypted message number of each of the plurality of sub-encrypted messages and decrypting it into the message of mass deployment setting; and executing the subsequent deployment according to content of the message of mass deployment setting after being booted initially after confirming that a format of the message of mass deployment setting conforms to a preset correct format.

In the foregoing, the method of device deployment further includes: sending a complete message in the BLE mode to reply to the sending device through the individual receiving device after the individual receiving device completes the subsequent deployment.

In the foregoing, the encryption and segmentation process first uses a built-in key to encrypt the message so as to obtain an encrypted message, and then segments the encrypted message into the plurality of sub-encrypted messages.

In the foregoing, the encryption and segmentation process segments the message into a plurality of sub-messages, and then uses a built-in key to encrypt the plurality of sub-messages so as to obtain the plurality of sub-encrypted messages.

The present disclosure provides a method of device deployment. The method of device deployment includes steps as follows: executing a BLE mode through each one of a plurality of receiving devices when being initially booted; decrypting a plurality of sub-encrypted messages repeatedly sent by a sending device executing the BLE mode, so as to generate a message of mass deployment setting corresponding to the plurality of sub-encrypted messages by any one individual receiving device in the plurality of receiving devices; and executing a subsequent deployment according to the message of mass deployment setting after the individual receiving device is booted initially through the individual receiving device.

In the foregoing, each of the plurality of sub-encrypted messages includes a message identifier of the message of mass deployment setting and a total number of messages of the plurality of sub-encrypted messages. The method of device deployment further includes: each time after the individual receiving device receives a sub-encrypted message in the plurality of sub-encrypted messages, continuing to receive other sub-encrypted messages with other sub-encrypted message numbers that match the message identifier in the BLE mode through the individual receiving device until a number of the received plurality of sub-encrypted messages reaches the total number of messages.

In the foregoing, each of the plurality of sub-encrypted messages repeatedly sent by the sending device further includes a sub-encrypted message number and an encrypted message body. The method of device deployment further includes: combining the plurality of encrypted message bodies correspondingly in the plurality of sub-encrypted messages in sequence according to the sub-encrypted message number of each of the plurality of sub-encrypted messages and decrypting it into the message of mass deployment setting through the individual receiving device.

In the foregoing, each of the plurality of sub-encrypted messages repeatedly sent by the sending device further includes a protocol identifier and a sender identifier of the sending device. The method of device deployment further includes: determining whether a format of the sub-encrypted message conforms to a preset legal format or not through the individual receiving device; determining whether the protocol identifier matches a preset protocol identifier or not through the individual receiving device when the format of the sub-encrypted message conforms to the preset legal format; and recording the sender identifier, the message identifier, and the total number of messages through the individual receiving device when the protocol identifier matches the preset protocol identifier.

The present disclosure further provides a system of device deployment. The system of device deployment includes a sending device and a plurality of receiving devices. The sending device generates a message of mass deployment setting, executes an encryption and segmentation process on the message to obtain a plurality of sub-encrypted messages, and executes a BLE mode to repeatedly send the plurality of sub-encrypted messages in sequence at fixed time intervals. The plurality of receiving devices are configured to be within a communication range of the BLE mode of the sending device. Each of the plurality of receiving devices activates a built-in initial boot service when being booted initially so that the each of the plurality of receiving devices executes the BLE mode to continuously receive the plurality of sub-encrypted messages. After any one individual receiving device in the plurality of receiving devices receives the plurality of sub-encrypted messages and decrypts them to restore into the message of mass deployment setting, the individual receiving device executes a subsequent deployment according to the message of mass deployment setting after the individual receiving device is booted initially.

In the foregoing, each of the plurality of sub-encrypted messages includes a protocol identifier, a sender identifier of the sending device, a message identifier of the message of mass deployment setting, a total number of messages of the plurality of sub-encrypted messages, a sub-encrypted message number, and an encrypted message body.

In the foregoing, each time when the individual receiving device receives a sub-encrypted message in the plurality of sub-encrypted messages, the individual receiving device determines whether a format of the sub-encrypted message conforms to a preset legal format or not. When the format of the sub-encrypted message conforms to the preset legal format, the individual receiving device determines whether the protocol identifier matches a preset protocol identifier or not. When the protocol identifier matches the preset protocol identifier, the individual receiving device records the sender identifier, the message identifier, and the total number of messages. The individual receiving device establishes a message list, and adds the sub-encrypted message number and the encrypted message body of the sub-encrypted message into the message list. The individual receiving device continues to receive other sub-encrypted messages with other sub-encrypted message numbers that match the message identifier in the BLE mode until a number of the received plurality of sub-encrypted messages reaches the total number of messages. The individual receiving device combines the plurality of encrypted message bodies correspondingly in the plurality of sub-encrypted messages in sequence according to the sub-encrypted message number of each of the plurality of sub-encrypted messages and decrypts it into the message of mass deployment setting. The individual receiving device executes the subsequent deployment according to content of the message of mass deployment setting after being booted initially after the individual receiving device confirms that a format of the message of mass deployment setting conforms to a preset correct format.

In the foregoing, the individual receiving device sends a complete message in the BLE mode to reply to the sending device after the individual receiving device completes the subsequent deployment.

In the foregoing, the encryption and segmentation process executed by the sending device first uses a built-in key to encrypt the message so as to obtain an encrypted message, and then segments the encrypted message into the plurality of sub-encrypted messages.

In the foregoing, the encryption and segmentation process executed by the sending device segments the message into a plurality of sub-messages, and then uses a built-in key to encrypt the plurality of sub-messages so as to obtain the plurality of sub-encrypted messages.

In summary, the technical solution of the present disclosure has obvious advantages and beneficial effects as compared with the related art. By using the system and method of device deployment according to the present disclosure, a large number of devices in a region can be unboxed and deployed by sending the BLE messages repeatedly, which not only eliminates the necessity of transmitting deployment settings through the Wi-Fi access points, but also eliminates labor-consuming manual operations.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 3 depicts a flowchart of a method of device deployment according to some embodiments of the present disclosure.

DESCRIPTION OF THE EMBODIMENTS

Figure 1:
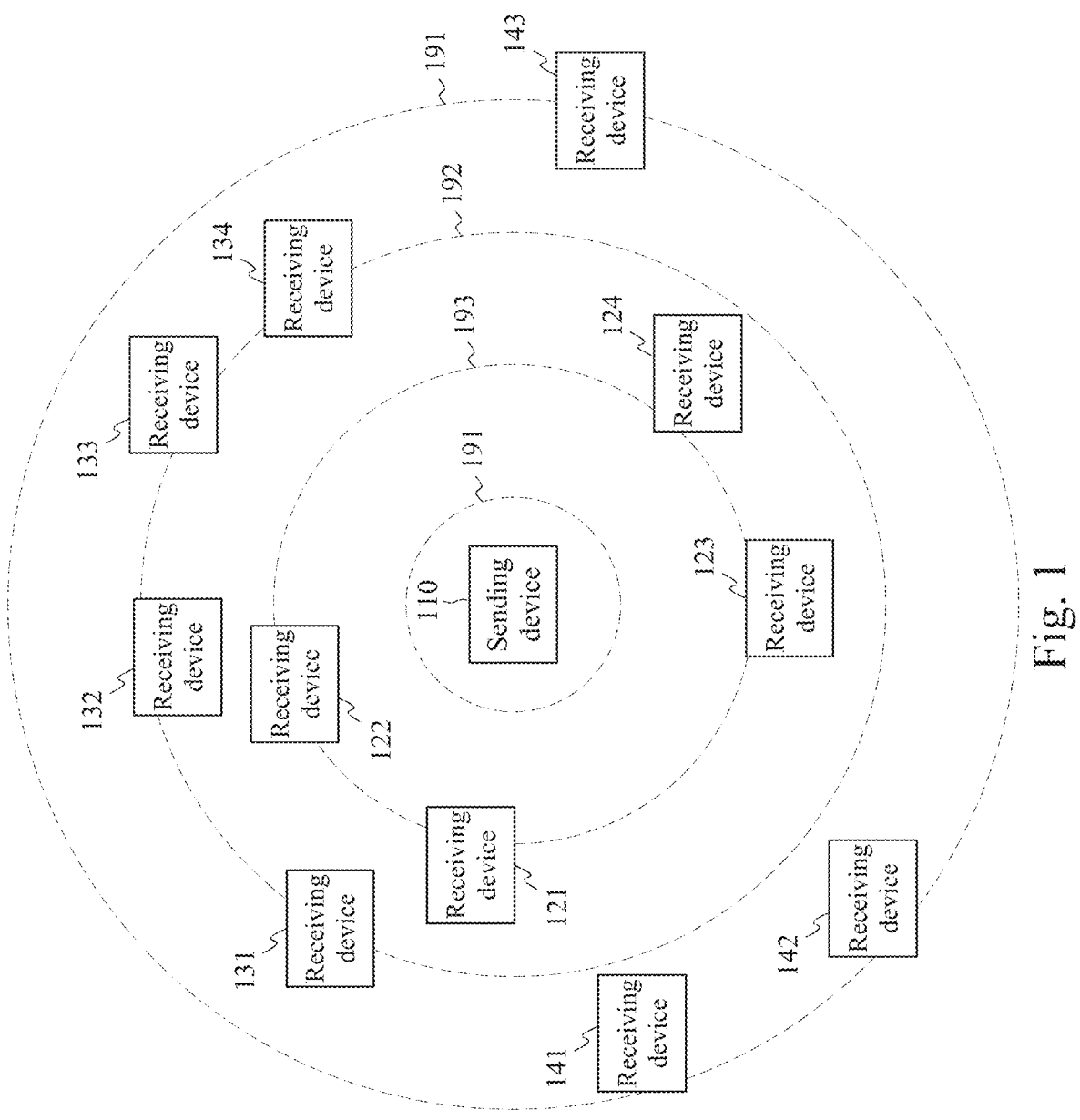
FIG. 1 depicts a block diagram of a system of device deployment according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. In other instance, well-known components and steps are not described in detail in the embodiments to avoid unnecessarily limiting the present disclosure.

A description is provided with reference to FIG. 1. One technical aspect of the present disclosure is to provide a system of device deployment 100, which can be applied to a computer or widely used in related technical links. The system of device deployment 100 of the present technical aspect can achieve considerable technological progress and has widespread industrial utilization value. The detailed implementation method of the system of device deployment 100 is described with reference to FIG. 1 as follows.

It should be understood that various embodiments of the system of device deployment 100 are described with reference to FIG. 1. In the following description, for purposes of explanation, numerous specific details are further set forth in order to provide a comprehensive illustration of one or more embodiments. However, the present technology may be implemented without these specific details. In other instances, well-known structures and components are shown in block diagram form to effectively describe the embodiments. The term "for example" used herein means "serving as an example, instance, or illustration." Any embodiment described herein as an "example" need not be construed as preferred or superior to other embodiments.

In practice, in some embodiments of the present disclosure, the system of device deployment 100 uses one device as a sending device 110 through a pre-activated Bluetooth Low Energy (BLE) mode, and repeatedly sends self-defined and encrypted sub-encrypted messages 191-193 to all other devices within a communication range of a BLE channel (such as receiving devices 121-124, 131-134, 141-143) continuously. The messages that are sent repeatedly do not need to be received in order. They can be encrypted individually and also can be encrypted and then split for distribution. Any receiving device that holds a key and can receive BLE messages can automatically execute subsequent message content analysis and related deployment as long as it collects the complete sub-encrypted messages 191-193 and decrypts them, and can selectively broadcast its own information to feed back into the sending device 110 after completion.

In greater detail, a description is provided with reference to FIG. 1. FIG. 1 depicts a block diagram of a system of device deployment 100 according to some embodiments of the present disclosure. As shown in FIG. 1, the system of device deployment 100 includes the sending device 110 and the receiving devices 121-124, 131-134, 141-143. For example, the sending device 110 and the receiving devices 121-124, 131-134, 141-143 may be the same or similar devices, such as tablet computers, smart phones, laptop computers, etc.

As for the structure, the receiving devices 121-124, 131-134, 141-143 are configured to be within a communication range of the BLE mode of the sending device 110.

When in use, each of the receiving devices 121-124, 131-134, 141-143 has a set of built-in keys for encrypting and decrypting messages, and a built-in service (such as an initial boot application). After being started, it runs in a receiving mode to continuously receive and filter BLE messages in the environment. The sending device 110 has a set of built-in keys for encrypting and decrypting messages, and a built-in service (such as a mass deployment application). After being started, it runs in a repeated sending mode and continues to send encrypted BLE messages. For example, the key of each of the receiving devices 121-124, 131-134, 141-143 and the key of the sending device 110 can be implemented through symmetric or asymmetric cryptography. The service of each of the receiving devices 121-124, 131-134, 141-143 and the service of the sending device 110 are compatible with each other.

Figure 2:
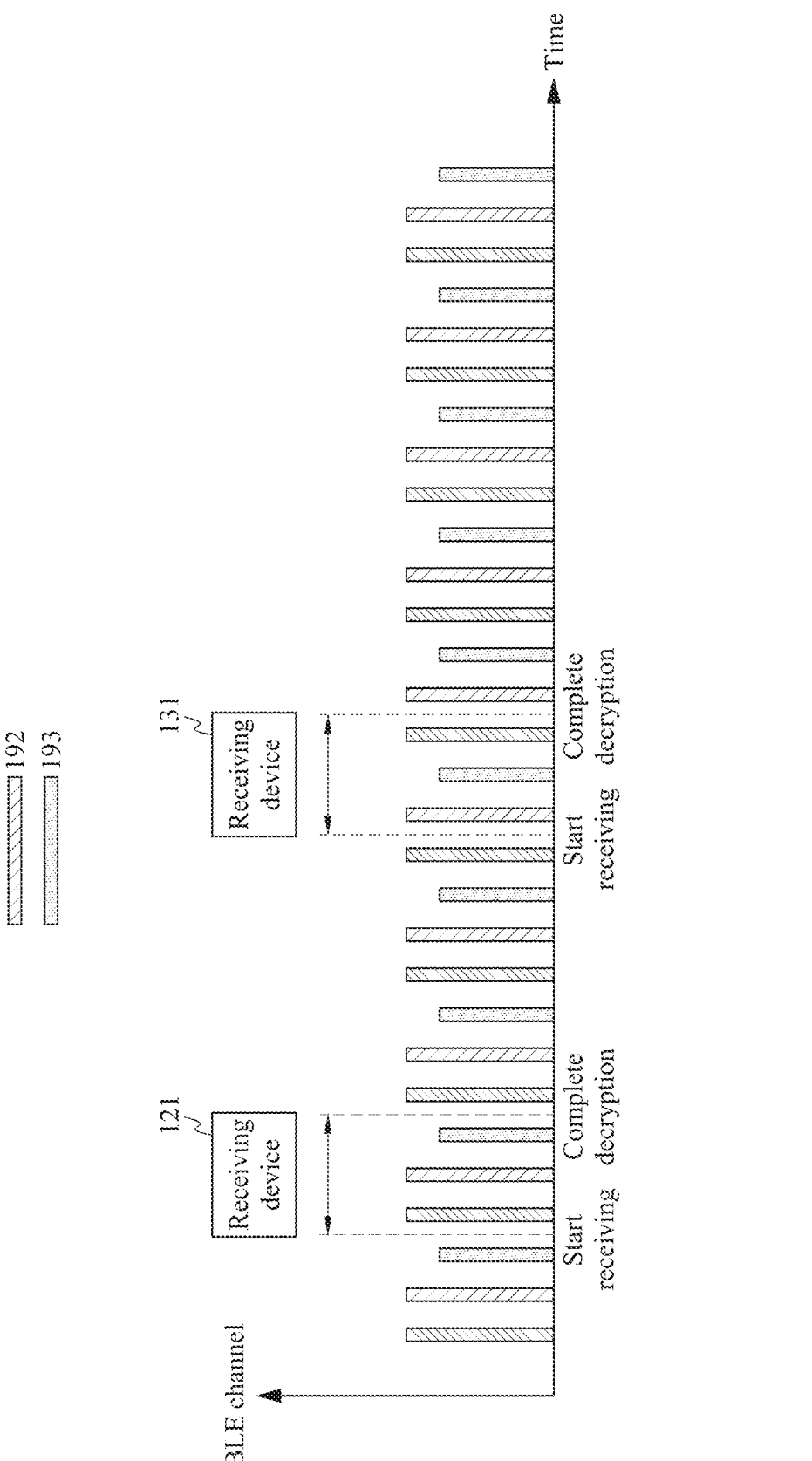
FIG. 2 depicts a timing diagram of a system of device deployment according to some embodiments of the present disclosure.

In order to provide a more detailed illustration of the operation method of the system of device deployment 100, a description is provided with reference to FIG. 1 to FIG. 3. FIG. 2 depicts a timing diagram of the system of device deployment 100 according to some embodiments of the present disclosure. FIG. 3 depicts a flowchart of a method of device deployment 300 according to some embodiments of the present disclosure. As shown in FIG. 3, the method of device deployment 300 includes steps S301-S304 (It should be understood that the order of the steps described in this embodiment, unless otherwise specified, can be adjusted depending on practical needs, and the steps can even be performed simultaneously or partially performed simultaneously).

In step S301, the sending device 110 generates a message of mass deployment setting, executes an encryption and segmentation process on the message to obtain the plurality of sub-encrypted messages 191-193. For example, the sending device 110 defines service set identifiers (SSIDs) and passwords of Wi-Fi APs in an environment as content of the above message.

As for the above encryption and segmentation process, in some embodiments of the present disclosure, the encryption and segmentation process executed by the sending device 110 first uses the built-in key to encrypt the message so as to obtain an encrypted message, and then segments the encrypted message into the plurality of sub-encrypted messages 191-193. Or, in some embodiments of the present disclosure, the encryption and segmentation process executed by the sending device 110 segments the message into a plurality of sub-messages, and then uses the built-in key to encrypt the plurality of sub-messages so as to obtain the plurality of sub-encrypted messages 191-193.

In step S302, the sending device 110 executes the BLE mode to repeatedly send the plurality of sub-encrypted messages 191-193 in sequence at fixed time intervals.

In step S303, each of the receiving devices 121-124, 131-134, 141-143 executes the BLE mode when being booted initially. In greater detail, each of the receiving devices 121-124, 131-134, 141-143 activates a built-in initial boot service (such as a built-in application) when being initially booted, so that each of the plurality of receiving devices 121-124, 131-134, 141-143 executes the BLE mode to continuously receive the plurality of sub-encrypted messages 191-193.

In step S304, any one individual receiving device of the plurality of receiving devices 121-124, 131-134, 141-143 decrypts the plurality of sub-encrypted messages 191-193 repeatedly sent by the sending device 110 that executes the BLE mode, so as to generate the message of mass deployment setting corresponding to the plurality of sub-encrypted messages 191-193. In greater detail, after any one individual receiving device in the plurality of receiving devices receives the plurality of sub-encrypted messages 191-193 and decrypts them to restore into the message of mass deployment setting, the individual receiving device executes a subsequent deployment according to the message of mass deployment setting after the individual receiving device is booted initially.

In practice, for example, the sending device 110 defines the service set identifiers (SSIDs) and the passwords of the Wi-Fi APs in the environment as the content of the message of mass deployment setting. As for the subsequent deployment, after the receiving devices 121-124, 131-134, 141-143 decrypt the content of the above message, they can connect to the Wi-Fi APs and perform subsequent Internet-related settings via Wi-Fi.

As for some fields of the above sub-encrypted messages 191-193, in some embodiments of the present disclosure, each of the plurality of sub-encrypted messages 191-193 may include a message identifier of the message of mass deployment setting and a total number of messages of the plurality of sub-encrypted messages 191-193 (such as three). In step S303, for simplicity of description, the receiving device 121 is taken as an example in some embodiments of the present disclosure. Each time after the receiving device 121 receives any one sub-encrypted message in the plurality of sub-encrypted messages 191-193 (take the sub-encrypted message 191 as an example), the receiving device 121 continues to receive the other sub-encrypted messages 192, 193 with other sub-encrypted message numbers that match the message identifier in the BLE mode until a number of the received plurality of sub-encrypted messages 191-193 reaches the total number of messages (such as three), thus confirming that all the sub-encrypted messages 191-193 have been fully received.

As for some fields of the above sub-encrypted messages 191-193, in some embodiments of the present disclosure, each of the plurality of sub-encrypted messages 191-193 repeatedly sent by the sending device 110 further includes a protocol identifier (Header) and a sender identifier of the sending device 110. In step S303, for simplicity of description, the receiving device 121 and the sub-encrypted message 191 are taken as an example in some embodiments of the present disclosure. The receiving device 121 determines whether a format of the sub-encrypted message 191 conforms to a preset legal format or not so as to filter out other messages in illegal formats. When the format of the sub-encrypted message 191 conforms to the preset legal format, the receiving device 121 determines whether the protocol identifier matches a preset protocol identifier or not to filter out other non-BLE protocol messages. When the protocol identifier matches the preset protocol identifier, the receiving device 121 records the sender identifier, the message identifier, and the total number of messages. By using the sender identifier of the sending device 110, the receiving device 121 can confirm the sub-encrypted messages 191-193 sent by the sending device 110.

As for some fields of the above sub-encrypted messages 191-193, in some embodiments of the present disclosure, each of the plurality of sub-encrypted messages 191-193 repeatedly sent by the sending device 110 may include a sub-encrypted message number and an encrypted message body. In step S304, for simplicity of description, the receiving device 121 is taken as an example in some embodiments of the present disclosure. The receiving device 121 combines the plurality of encrypted message bodies correspondingly in the plurality of sub-encrypted messages 191-193 in sequence according to the sub-encrypted message number of each of the plurality of sub-encrypted messages 191-193 and decrypts it into the message of mass deployment setting. By combining the corresponding encrypted message bodies according to the order of the sub-encrypted message numbers, combination errors are avoided.

It should be understood that, depending on practical situations, the fields of the sub-encrypted messages 191-193 can be adjusted. For example, if each one in the plurality of sub-encrypted messages 191-193 is independently encrypted, then the total number of messages of the plurality of sub-encrypted messages 191-193 and the sub-encrypted message numbers can be placed in the encrypted message bodies. If the message of mass deployment setting is encrypted and then segmented into the plurality of sub-encrypted messages 191-193, the total number of messages of the plurality of sub-encrypted messages 191-193 and the sub-encrypted message numbers can be moved to outsides of the encrypted message bodies. In addition, the sending device 110 can also use a data compression technology on the message of mass deployment setting and/or the plurality of sub-encrypted messages 191-193 to reduce message lengths, and use timestamp(s) and/or additional hash(es)/error-correcting code(s) to ensure message integrity.

In summary, as for the fields roughly required for composing the above sub-encrypted messages 191-193, in some embodiments of the present disclosure, each of the plurality of sub-encrypted messages 191-193 includes the protocol identifier (Header), the sender identifier of the sending device 110, the message identifier of the message of mass deployment setting, the total number of messages of the plurality of sub-encrypted messages 191-193, the sub-encrypted message number, and the encrypted message body.

As mentioned previously, in steps S303 and S304, for simplicity of description, the receiving device 121 is taken as an example in some embodiments of the present disclosure. Each time when the receiving device 121 receives any one sub-encrypted message in the plurality of sub-encrypted messages 191-193 (in the following, take the sub-encrypted message 191 as an example), the receiving device 121 determines whether the format of the sub-encrypted message 191 conforms to the preset legal format or not. When the format of the sub-encrypted message 191 conforms to the preset legal format, the receiving device 121 determines whether the protocol identifier matches the preset protocol identifier or not. When the protocol identifier matches the preset protocol identifier, the receiving device 121 records the sender identifier, the message identifier, and the total number of messages (such as three). The receiving device 121 establishes a message list, and adds the sub-encrypted message number and the encrypted message body of the sub-encrypted message 191 into the message list. The receiving device 121 continues to receive the other sub-encrypted messages 192, 193 with the other sub-encrypted message numbers that match the message identifier in the BLE mode until the number of the received plurality of sub-encrypted messages 191-193 reaches the total number of messages (such as three). The receiving device 121 combines the plurality of encrypted message bodies correspondingly in the plurality of sub-encrypted messages 191-193 in sequence according to the sub-encrypted message number of each of the plurality of sub-encrypted messages 191-193 and decrypts it into the message of mass deployment setting. After the receiving device 121 confirms that a format of the message of mass deployment setting conforms to a preset correct format, the receiving device 121 executes the subsequent deployment according to content of the message of mass deployment setting after being booted initially.

In some embodiments of the present disclosure, after the individual receiving device completes the subsequent deployment, the individual receiving device sends a complete message in the BLE mode to reply to the sending device 110, so that the sending device 110 can record the receiving device that has been deployed in the receiving devices 121-124, 131-134, 141-143.

In practice, for example, there may be many sending devices 110, which repeatedly send the same message of mass deployment setting. Since the sending devices 110 use the repeated sending mechanism, the receiving devices 121-124, 131-134, 141-143 do not need to care about the timing to approach the field, and they can decrypt as long as each of the sub-encrypted messages 191-193 in the message list is completely received.

Figure 4:
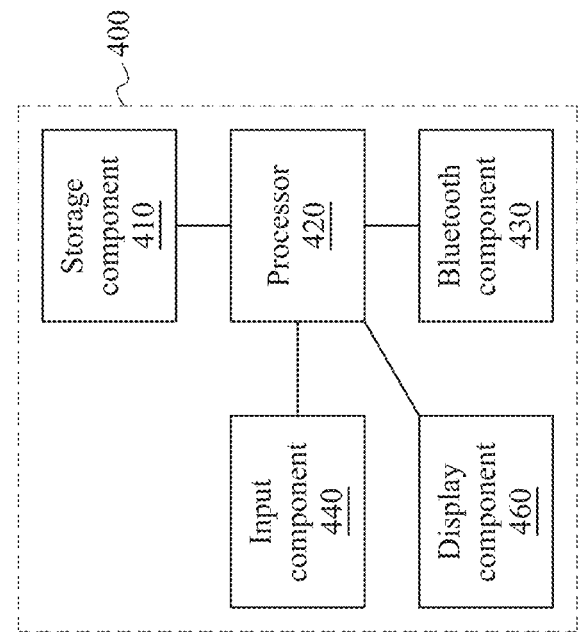
FIG. 4 depicts a block diagram of a device according to some embodiments of the present disclosure.

FIG. 4 depicts a block diagram of a device 400 according to some embodiments of the present disclosure. In practice, for example, the structure of the device 400 is adapted for the sending device 110 in FIG. 1. The structure of the device 400 is also adapted for any one of the receiving devices 121-124, 131-134, 141-143 in FIG. 1.

As shown in FIG. 4, the device 400 includes a storage component 410, a processor 420, a Bluetooth component 430, an input component 440, and a display component 460. For example, the storage component 410 may be a hard disk, a flash memory, or some other storage medium. The processor 420 may be a central processing unit or a controller. The Bluetooth component 430 may be a Bluetooth transceiver. The input component 440 may be a key, a touch component, or some other input component. The display component 460 may be a liquid crystal display or some other display.

As for the structure, the storage component 410, the Bluetooth component 430, the input component 440, and the display component 460 are electrically connected to the processor 420. It should be understood that, in the descriptions of the embodiments and the claims of the patent application, the description of "electrical connection" may refer to the indirect electrical coupling of one component to another component through other component(s), or the direct electrical connection of one component to another component without through other component(s). For example, the storage component 410 may be a built-in storage component directly electrically connected to the processor 420. Or, the storage component 410 may be an external storage component indirectly connected to the processor 420 through a network device.

A description is provided with reference to FIG. 1 and FIG. 4. In some embodiments of the present disclosure, the structure of the device 400 is adapted for the sending device 110 in FIG. 1. The storage component 410 stores a set of keys and a mass deployment service (such as a mass deployment application). The processor 420 executes the service to generate the message of mass deployment setting, executes an encryption and segmentation process on the message by using the key to obtain the plurality of sub-encrypted messages 191-193, and executes the BLE mode through the Bluetooth component 430 to repeatedly send the plurality of sub-encrypted messages 191-193 in sequence at fixed time intervals.

A description is provided with reference to FIG. 1 and FIG. 4. In some embodiments of the present disclosure, the structure of the device 400 is also adapted for any one of the receiving devices 121-124, 131-134, 141-143 in FIG. 1. The storage component 410 stores a set of keys and a built-in initial boot service (such as the initial boot application). During initial booting, the processor 420 activates the built-in initial boot service, and executes the BLE mode through the Bluetooth component 430 to continuously receive the plurality of sub-encrypted messages 191-193. After the processor 420 receives the plurality of sub-encrypted messages 191-193 through the Bluetooth component 430 and decrypt them to restore into the message of mass deployment setting, the processor 420 executes the subsequent deployment according to the message of mass deployment setting after the receiving device is booted initially.

In summary, the technical solution of the present disclosure has obvious advantages and beneficial effects as compared with the related art. By using the system of device deployment 100 and the method of device deployment 300 according to the present disclosure, a large number of devices in a region can be unboxed and deployed by sending the BLE messages repeatedly, which not only eliminates the necessity of transmitting deployment settings through the Wi-Fi access points, but also eliminates labor-consuming manual operations.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A method of device deployment comprising:

generating a deployment message of mass deployment setting and executing an encryption and segmentation process on the deployment message of mass deployment setting to obtain a plurality of sub-encrypted messages through a sending device;

executing a Bluetooth Low Energy (BLE) mode to repeatedly send the plurality of sub-encrypted messages in sequence at fixed time intervals through the sending device to a plurality of receiving devices, wherein the plurality of receiving devices are configured to be within a communication range of a BLE channel from the sending device;

activating a built-in initial boot service through each of the plurality of receiving devices when being booted initially so that the each of the plurality of receiving devices executes the BLE mode to continuously receive the plurality of sub-encrypted messages within the communication range of the BLE channel from the sending device; and after any one individual receiving device in the plurality of receiving devices receives the plurality of sub-encrypted messages and decrypts the plurality of sub-encrypted messages to restore into the deployment message of mass deployment setting, executing a subsequent deployment according to the deployment message of mass deployment setting after the individual receiving device is booted initially through the individual receiving device.

2. The method of device deployment of claim 1, wherein each of the plurality of sub-encrypted messages comprises a protocol identifier, a sender identifier of the sending device, a message identifier of the deployment message of mass deployment setting, a total number of messages of the plurality of sub-encrypted messages, a sub-encrypted message number, and an encrypted message body.

3. The method of device deployment of claim 2, wherein executing the subsequent deployment according to the deployment message of mass deployment setting after the individual receiving device is booted initially through the individual receiving device after the any one individual receiving device in the plurality of receiving devices receives the plurality of sub-encrypted messages and decrypts the plurality of sub-encrypted messages to restore into the deployment message of mass deployment setting comprises:

each time when the individual receiving device receives a sub-encrypted message in the plurality of sub-encrypted messages, determining whether a format of the sub-encrypted message conforms to a preset legal format or not;

determining whether the protocol identifier matches a preset protocol identifier or not when the format of the sub-encrypted message conforms to the preset legal format;

recording the sender identifier, the message identifier, and the total number of messages when the protocol identifier matches the preset protocol identifier;

establishing a message list, and adding the sub-encrypted message number and the encrypted message body of the sub-encrypted message into the message list;

continuing to receive other sub-encrypted messages with other sub-encrypted message numbers that match the message identifier in the BLE mode until a number of the received plurality of sub-encrypted messages reaches the total number of messages;

combining the plurality of encrypted message bodies correspondingly in the plurality of sub-encrypted messages in sequence according to the sub-encrypted message number of each of the plurality of sub-encrypted messages and decrypting the plurality of encrypted message bodies correspondingly in the plurality of sub-encrypted messages into the deployment message of mass deployment setting; and executing the subsequent deployment according to content of the deployment message of mass deployment setting after being booted initially after confirming that a format of the deployment message of mass deployment setting conforms to a preset correct format.

4. The method of device deployment of claim 1, further comprising:

sending a complete message in the BLE mode to reply to the sending device through the individual receiving device after the individual receiving device completes the subsequent deployment.

5. The method of device deployment of claim 1, wherein the encryption and segmentation process first uses a built-in key to encrypt the deployment message of mass deployment setting so as to obtain an encrypted message, and then segments the encrypted message into the plurality of sub-encrypted messages.

6. The method of device deployment of claim 1, wherein the encryption and segmentation process segments the deployment message of mass deployment setting into a plurality of sub-messages, and then uses a built-in key to encrypt the plurality of sub-messages so as to obtain the plurality of sub-encrypted messages.

7. A method of device deployment comprising:

executing a Bluetooth Low Energy (BLE) mode through each one of a plurality of receiving devices when being initially booted responsive to a built-in initial boot service, wherein the plurality of receiving devices are configured to be within a communication range of a BLE channel from a sending device;

decrypting a plurality of sub-encrypted messages repeatedly sent by the sending device executing a pre-activated BLE mode during the device deployment, so as to generate by any one individual receiving device in the plurality of receiving devices a deployment message of mass deployment setting corresponding to the plurality of sub-encrypted messages sent by the sending device during the device deployment within the communication range of the BLE channel; and executing a subsequent deployment according to the deployment message of mass deployment setting after the individual receiving device collects each of the plurality of sub-encrypted messages, decrypts and restores the each of the plurality of sub-encrypted messages into a complete message and is booted initially through the individual receiving device.

8. The method of device deployment of claim 7, wherein each of the plurality of sub-encrypted messages comprises a message identifier of the deployment message of mass deployment setting and a total number of messages of the plurality of sub-encrypted messages, the method of device deployment further comprises:

each time after the individual receiving device receives a sub-encrypted message in the plurality of sub-encrypted messages, continuing to receive other sub-encrypted messages with other sub-encrypted message numbers that match the message identifier in the BLE mode through the individual receiving device until a number of the received plurality of sub-encrypted messages reaches the total number of messages.

9. The method of device deployment of claim 8, wherein each of the plurality of sub-encrypted messages repeatedly sent by the sending device further comprises a sub-encrypted message number and an encrypted message body, the method of device deployment further comprises:

combining the plurality of encrypted message bodies correspondingly in the plurality of sub-encrypted messages in sequence according to the sub-encrypted message number of each of the plurality of sub-encrypted messages and decrypting the plurality of encrypted message bodies correspondingly in the plurality of sub-encrypted messages into the deployment message of mass deployment setting through the individual receiving device.

10. The method of device deployment of claim 8, wherein each of the plurality of sub-encrypted messages repeatedly sent by the sending device further comprises a protocol identifier and a sender identifier of the sending device, the method of device deployment further comprises:

determining whether a format of the sub-encrypted message conforms to a preset legal format or not through the individual receiving device;

determining whether the protocol identifier matches a preset protocol identifier or not through the individual receiving device when the format of the sub-encrypted message conforms to the preset legal format; and recording the sender identifier, the message identifier, and the total number of messages through the individual receiving device when the protocol identifier matches the preset protocol identifier.

11. A system of device deployment comprising:

a sending device generating a deployment message of mass deployment setting during a built-in initial boot service, executing an encryption and segmentation process on the generated deployment message of mass deployment setting to obtain a plurality of sub-encrypted messages, and executing a Bluetooth Low Energy (BLE) mode to repeatedly send the plurality of sub-encrypted messages in sequence at fixed time intervals to a plurality of receiving devices configured to be within a communication range of a BLE channel from the sending device; and each of the plurality of receiving devices activating the built-in initial boot service when being booted initially so that the each of the plurality of receiving devices executes the BLE mode to continuously receive the plurality of sub-encrypted messages, after any one individual receiving device in the plurality of receiving devices receives the plurality of sub-encrypted messages and decrypts the plurality of sub-encrypted messages to restore into the deployment message of mass deployment setting, the individual receiving device executing a subsequent deployment according to the deployment message of mass deployment setting after the individual receiving device is booted initially.

12. The system of device deployment of claim 11, wherein each of the plurality of sub-encrypted messages comprises a protocol identifier, a sender identifier of the sending device, a message identifier of the deployment message of mass deployment setting, a total number of messages of the plurality of sub-encrypted messages, a sub-encrypted message number, and an encrypted message body.

13. The system of device deployment of claim 12, wherein each time when the individual receiving device receives a sub-encrypted message in the plurality of sub-encrypted messages, the individual receiving device determines whether a format of the sub-encrypted message conforms to a preset legal format or not, when the format of the sub-encrypted message conforms to the preset legal format, the individual receiving device determines whether the protocol identifier matches a preset protocol identifier or not, when the protocol identifier matches the preset protocol identifier, the individual receiving device records the sender identifier, the message identifier, and the total number of messages, the individual receiving device establishes a message list, and adds the sub-encrypted message number and the encrypted message body of the sub-encrypted message into the message list, the individual receiving device continues to receive other sub-encrypted messages with other sub-encrypted message numbers that match the message identifier in the BLE mode until a number of the received plurality of sub-encrypted messages reaches the total number of messages, the individual receiving device combines the plurality of encrypted message bodies correspondingly in the plurality of sub-encrypted messages in sequence according to the sub-encrypted message number of each of the plurality of sub-encrypted messages and decrypts the plurality of encrypted message bodies correspondingly in the plurality of sub-encrypted messages into the deployment message of mass deployment setting, the individual receiving device executes the subsequent deployment according to content of the deployment message of mass deployment setting after being booted initially after the individual receiving device confirms that a format of the deployment message of mass deployment setting conforms to a preset correct format.

14. The system of device deployment of claim 11, wherein the individual receiving device sends a complete message in the BLE mode to reply to the sending device after the individual receiving device completes the subsequent deployment.

15. The system of device deployment of claim 11, wherein the encryption and segmentation process executed by the sending device first uses a built-in key to encrypt the deployment message of mass deployment setting so as to obtain an encrypted message, and then segments the encrypted message into the plurality of sub-encrypted messages.

16. The system of device deployment of claim 11, wherein the encryption and segmentation process executed by the sending device segments the message of mass deployment setting into a plurality of sub-messages, and then uses a built-in key to encrypt the plurality of sub-messages so as to obtain the plurality of sub-encrypted messages.

* * * * *